United States Patent [19]
Larson

[11] Patent Number: 5,228,231
[45] Date of Patent: Jul. 20, 1993

[54] CONTAINER FOR HOLDING AND DISPENSING FISH BAIT OR THE LIKE

[75] Inventor: Donald A. Larson, Lindstrom, Minn.

[73] Assignee: Hog Rustler, Inc., Memphis, Tenn.

[21] Appl. No.: 912,253

[22] Filed: Jul. 13, 1992

[51] Int. Cl.$^5$ .............................................. A01K 97/04
[52] U.S. Cl. ................................................ 43/56; 43/55
[58] Field of Search ............. 43/56, 55; 206/315.11; 220/259; 119/3, 5

[56] References Cited

U.S. PATENT DOCUMENTS

| | | | |
|---|---|---|---|
| 372,124 | 10/1887 | Craig | 43/56 |
| 986,229 | 3/1911 | Seeger | 43/56 |
| 2,002,572 | 5/1935 | Forbes et al. | 43/56 |
| 2,600,826 | 6/1952 | Allen | 43/56 |
| 3,000,132 | 9/1961 | Koistinen | 43/56 |
| 3,002,312 | 10/1961 | Barker | 43/56 |
| 3,039,225 | 6/1962 | Semelka | 43/56 |
| 3,380,186 | 4/1968 | Donner | 43/56 |
| 3,726,039 | 4/1973 | Borrelli | 43/56 |
| 3,886,679 | 6/1975 | Marcell | 43/55 |
| 3,954,172 | 5/1976 | Rinella | 43/55 |
| 3,955,306 | 5/1976 | Handa | 43/56 |
| 4,030,227 | 6/1977 | Oftedahl | 43/55 |
| 4,864,769 | 9/1989 | Sandahl | 43/55 |

Primary Examiner—Kurt C. Rowan
Attorney, Agent, or Firm—Walker, McKenzie & Walker

[57] ABSTRACT

A fish bait container or the like including a bucket having a cavity for holding a quantity of water or the like and a quantity of fish bait, such as minnows, shrimp, or the like, dispersed in the water; a lid movable between a first position covering the mouth of the bucket and a second position positioned away from the mouth of the bucket; and an arm fixedly joined to the lid for movement with the lid and for substantially separating the fish bait from the water when the lid is moved from the first position to the second position. The bucket is preferably molded out of Styrofoam ® or the like. The lid and arm are preferably molded out of plastic as a one-piece, integral unit which is pivotally attached to the bucket.

4 Claims, 2 Drawing Sheets

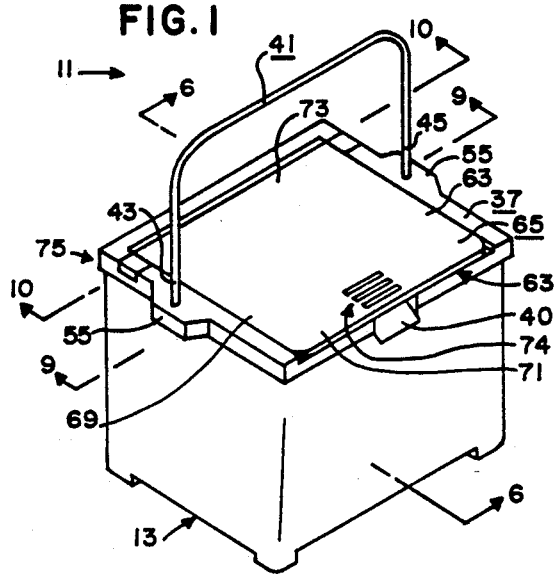
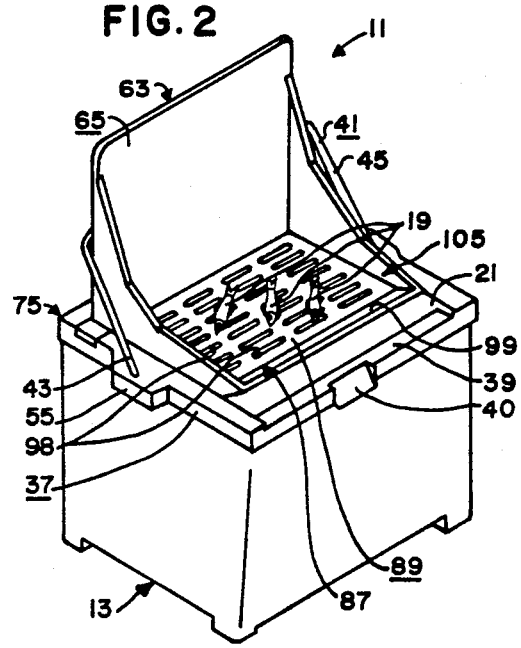
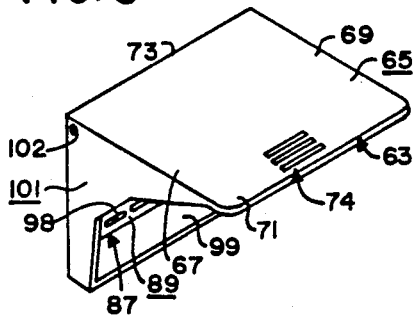
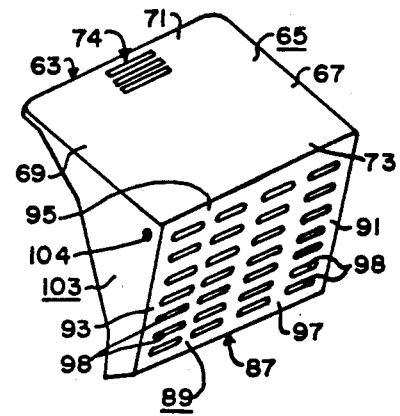
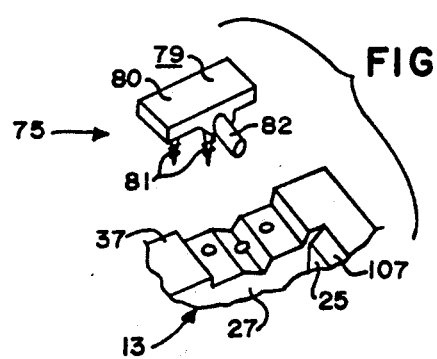

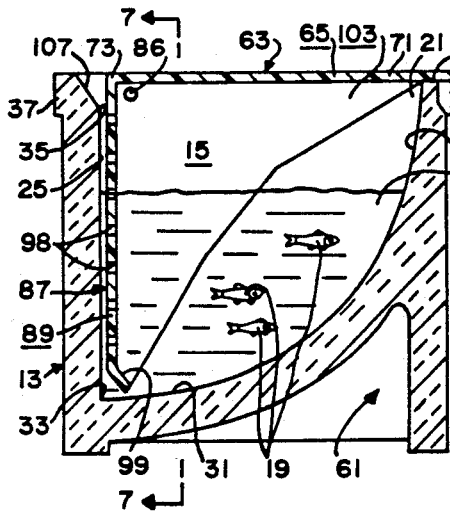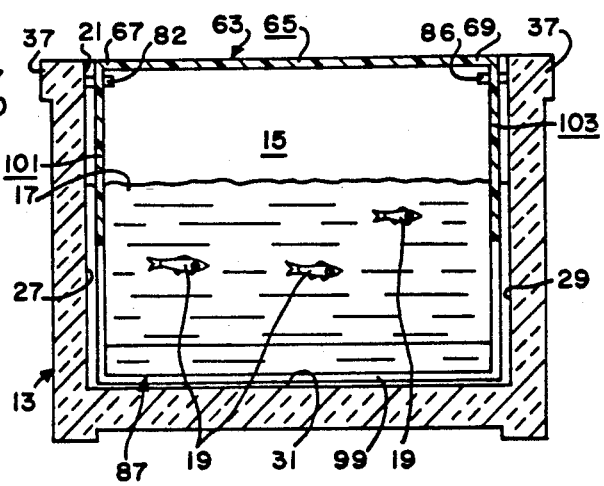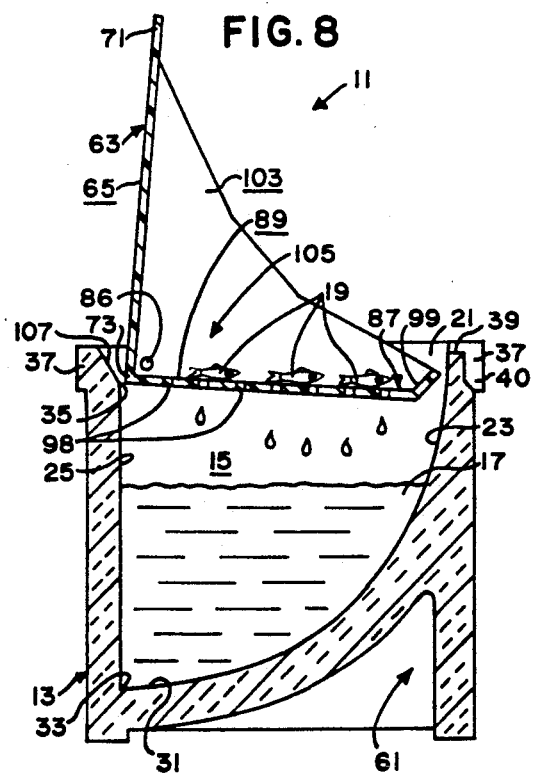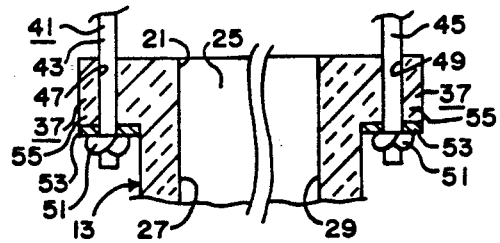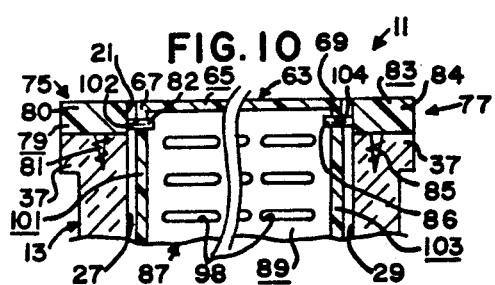

CONTAINER FOR HOLDING AND DISPENSING FISH BAIT OR THE LIKE

BACKGROUND OF THE INVENTION

Field of the Invention

The present invention relates, in general, to a container for holding and selectively dispensing a quantity of live minnows or the like.

Description of the Related Art

A preliminary patentability search in class 43, subclasses 54.1 and 56 produced the following patents which may relate to the present invention but which, taken as a whole, do not disclose or suggest the present invention:

Allen, U.S. Pat. No. 2,600,826, issued Jun. 17, 1952, discloses a bait container that includes a cylindrical outer shell having opened bottom and top ends and having float means for allowing the outer shell to float on a body of water or the like, a movable lid for selectively closing the opened top end of the outer shell, and a perforated bottom member slidably positioned within the outer shell for vertical movement therein. A bail is attached to the bottom member for allowing a user to vertically lift the bottom member in the outer shell to allow bait to be easily viewed and removed.

Barker, U.S. Pat. No. 3,002,312, issued Oct. 3, 1961, discloses a minnow bucket which forms a trap when turned upon its side, and which forms a container for retaining minnows therein when turned to an upright position. The bucket includes a dipper which can be lifted vertically to a raised position to raise the minnows from the water to facilitate access to the minnows.

Donner, U.S. Pat. No. 3,380,186, issued Apr. 30, 1968, discloses a minnow bucket comprising inner and outer containers, a screen pivotally connected to the inner container, a spout at one end of the screen, and mechanism for tilting the screen to net the minnows out of the inner container and move the minnows to the spout for subsequent dispensing into the user's hands.

Borrelli, U.S. Pat. No. 3,726,039, issued Apr. 10, 1973, discloses a minnow pail in which minnows and other forms of bait are moved by gating means between two juxtaposed chambers, one of which is pressurized by a gas mixture. The other chamber is opened at the top for allowing bait to be withdrawn from the pail. Both chambers are opened at the bottom for allowing the passage of the bait between the juxtaposed chambers. In one embodiment, the bottom of the pail is curved, and the gating means includes a rotatable horizontal shaft mounted on a partition between the two chambers, and a pair of baffles radially fixed to the shaft and spaced apart from one another about 90 degrees to trap the minnows between one another so that rotation of the shaft will cause the baffles to rotate to selectively move the minnows between the two chambers through the lower portion of the pail. In a second embodiment, the bottom of the pail is flat, and the gating means includes a rotatable vertical shaft mounted on the partition between the two chambers, and a box for holding the minnows is fixed to the bottom of the shaft so that rotation of the shaft will cause the box and, thus, the minnows, to rotate between the two chambers.

Handa, U.S. Pat. No. 3,955,306, issued May 11, 1976, discloses a live bait bucket including an inner container and an outer container. The inner container is provided with a vertically movable scoop and a hinged lid for closing the access opening in the container. The lid is formed with an elongated slot and a pull rod connected to the scoop projects up through the slot. Abutment means are mounted on the pull rod and slidably engages the underside of the lid so that lifting of the pull rod simultaneously lifts the scoop and opens the lid. Spring means are provided for automatically closing the lid when the pull rod is released.

Sandahl, U.S. Pat. No. 4,864,769, issued Sep. 12, 1989, discloses a pop-up bait server including an outer container, an inner container fitting at least partially inside the outer container, and a latch mechanism for releasably restraining the inner container inside the outer container so that the inner container is at least partially under water when the outer container is at least partially filled with water. The inner container includes buoyant means for causing the inner container to move to a raised position when the latch mechanism is opened. A screen is provided on the sides of the inner container to allow water to drain therefrom when the inner container moves to the raised position.

SUMMARY OF THE INVENTION

The present invention is directed toward providing an improved container for use by fishermen or the like to contain and easily dispense live, water-based bait or the like. The concept of the present invention is to provide a bucket having a cavity for holding a quantity of water and a quantity of bait, with a lid unit having a lid for closing the mouth of the bucket and having an elongated arm attached to the lid for lifting the bait from the water when the lid is moved to an opened position.

One object of the present invention is to provide a fish bait container which will automatically lift the bait from water or the like within the container when the lid of the container is opened.

Another object of the present invention is to provide a fish bait container with means to aerate water or the like within the container each time the lid of the container is moved between opened and closed positions.

Another object of the present invention is to provide a fish bait container which eliminates the need for a minnow net or the like to remove minnows or the like from water or the like within the container.

Another object of the present invention is to provide a fish bait container which eliminates the need for a person to stick a hand into the water or the like within the container, and thereby eliminate cold hands and possible contamination of the water.

The container of the present invention includes, in general, a bucket having a cavity for holding a quantity of fluid and a quantity of items dispersed in the quantity of fluid; the bucket having a mouth for allowing access to the cavity; a lid movable between a first position in which the lid covers the mouth of the bucket and a second position in which the lid is positioned away from the mouth of the bucket; and arm means fixedly joined to the lid for movement with the lid between a first position when the lid is in the first position and a second position when the lid is in the second position, and for substantially separating the quantity of items from the quantity of fluid when moved from the first position to the second position.

BRIEF DESCRIPTION OF THE DRAWINGS

FIG. 1 is a perspective view of the container of the present invention as taken from the front thereof with the lid unit thereof in a closed position.

FIG. 2 is a perspective view of the container of the present invention as taken from the front thereof with the lid unit thereon in an opened position.

FIG. 3 is a perspective view of the lid unit of the container of the present invention as taken from the front.

FIG. 4 is a perspective view of the lid unit of the container of the present invention as taken from the back.

FIG. 5 is an exploded perspective view of a hinge pin unit and a portion of a bucket of the container of the present invention.

FIG. 6 is a sectional view of a portion of the container of the present invention substantially as taken on line 6—6 of FIG. 1 with portions thereof omitted for clarity.

FIG. 7 is a sectional view of a portion of the container of the present invention substantially as taken on line 7—7 of FIG. 6.

FIG. 8 is a sectional view of a portion of the container of the present invention similar to FIG. 6 but showing the lid unit thereof in an opened position.

FIG. 9 is a sectional view of a portion of the container of the present invention substantially as taken on line 9—9 of FIG. 1 on a somewhat enlarged scale with portions thereof broken away for clarity.

FIG. 10 is a sectional view of a portion of the container of the present invention substantially as taken on line 10—10 of FIG. 1 on a somewhat enlarged scale with portions thereof broken away for clarity.

DESCRIPTION OF THE PREFERRED EMBODIMENT

The preferred embodiment of the container of the present invention is shown in FIGS. 1-10 and identified by the numeral 11.

The container 11 includes a bucket 13 having a cavity 15 for holding a quantity of fluid and a quantity of items dispersed in the quantity of fluid. More specifically, the cavity 15 is preferably adapted to hold a quantity of water 17 or the like, and a quantity of live minnows 19 or other live, water-based fish bait such as shrimp or the like dispersed in the water 17. The bucket 13 has a mouth 21 for allowing access to the cavity 15. The bucket 13 may be constructed in various specific manners out of various specific materials in various specific designs and sizes. The bucket 13 is preferably molded or otherwise constructed out of Styrofoam ® or the like with a somewhat rectangular box-shaped exterior and with a height of approximately 9 inches (228.6 millimeters), a width of approximately 13 inches (330.2 millimeters), and a depth of approximately 10 inches (254 millimeters). The mouth 21 is preferably substantially rectangular, but could be square.

The cavity 15 preferably has a front wall 23, a back wall 25, a first side wall 27, a second side wall 29, and a bottom 31. The bottom 31 and front wall 23 of the cavity 15 preferably curves upwardly from the intersection 33 of the lower end of the back wall 25 and the bottom 31 thereof as clearly shown in FIGS. 6 and 8. The center of the curve in the bottom 31 and front wall 23 of the cavity 15 in the bucket 13 from the intersection 33 of the lower end of the back wall 25 and the bottom 31 thereof is preferably at a point adjacent the intersection 35 between the top end of the back wall 25 of the cavity 15 and the mouth 21 of the bucket 13 as will hereinafter become apparent.

The upper end of the bucket 13 may have an outwardly directed rim or lip 37 forming the upper ends of the front wall 23, back wall 25, first side wall 27 and second side wall 29 and extending around the mouth 21 for reinforcing the mouth 21, etc. The upper surface of the portion 39 of the lip 37 forming the upper end of the front wall 23 of the cavity 15 is preferably lower than the other three sides of the lip 37 as clearly shown in FIG. 2 for reasons which will hereinafter become apparent. A central notch 40 is preferably provided on the front face of the bucket 13 in communication with the portion 39 of the lip 37 as shown in FIG. 2 for reasons which will hereinafter become apparent.

The container 11 preferably includes a handle member 41 for being attached to the bucket 13 to allow the bucket 13 to be picked-up and carried, etc. The handle member 41 preferably consists of an elongated, flexible, nylon rope or the like having a first end 43 and a second end 45. A normally substantially vertical aperture 4 is preferably provided through the lip 37 above the first side wall 27 of the cavity 15 for receiving the first end 43 of the handle member 41. A normally substantially vertical aperture 49 is preferably provided through the lip 37 above the second side wall 29 of the cavity 15 for receiving the second end 45 of the handle member 41. The handle member 41 can then be securely attached to the bucket 13 by merely tying knots 51 in the first and second ends 43, 45 thereof after the ends 43, 45 have been passed through the respective apertures 47, 49, etc., as shown in FIG. 9 and as will now be apparent to those skilled in the art. Washers 53 are preferably provided between the knots 51 and the underside of the lip 37 as shown in FIG. 9 for reinforcement, etc., as will now be apparent to those skilled in the art. The lip 37 may have an enlarged portion 55 about each aperture 47, 49 to provide additional room for the apertures 47, 49 and for strengthening the lip 37, etc., as will now be apparent to those skilled in the art. The apertures 47, 49 are preferably spaced between the front and back walls 23, 25 of the cavity 15 a distance so as to be substantially aligned with a plane that is parallel to the back wall 25 of the cavity 15 and that passes through the center of gravity of the cavity 15 when the cavity 15 is filled with water 17 to thereby make the bucket 13 easy to pick up when filled with water 17, etc. That is, because of the curved front wall 23 and bottom 31, the center of gravity of the bucket 13 will be closer to the back wall 25 than the front wall 23 when the cavity 15 is filled with water 17 as will now be apparent to those skilled in the art.

A cavity 61 may be formed in the bottom of the bucket 13 as shown in FIGS. 6 and 8 for reducing the amount of material required to manufacture the bucket 13, and for reducing the weight of the bucket 13, etc., as will now be apparent to those skilled in the art.

The container 11 includes a lid 63 forming part of a lid unit of the container 11. The lid 63 is movable between a first or closed position as shown in FIGS. 1, 6, 7 and 10 in which the lid 63 covers the mouth 21 of the bucket 13, and a second or opened position as shown in FIGS. 2 and 8 in which the lid 63 is positioned away from the mouth of the bucket 13. The lid 63 preferably includes a substantially flat panel member 65 having a first side edge 67 for being positioned adjacent the top of the first side wall 27 of the cavity 15 when the lid 63 is in the closed position, a second side edge 69 for being positioned adjacent the top of the second side wall 29 of the cavity 15 when the lid 63 is in the closed position, a third side or front edge 71 for resting on the portion 39 of the lip 37 over the front wall 23 of the cavity 15 when the lid 63 is in the closed position, and a fourth side or back edge 73 for being positioned adjacent the top of the back wall 25 of the cavity 15 when the lid 63 is in the closed position. A plurality of ridges 74 are preferably provided on the top of the panel member 65 near the front edge 71 thereof substantially centered between the first and second side edges 67, 69 thereof.

The container 11 preferably includes pivot means for pivotally attaching the lid 63 to the bucket 13 to allow the lid 6 to pivot between the closed and opened positions. The pivot means preferably includes a first pivot means 75 for pivotally attaching the lid unit adjacent the first side edge 67 of the panel member 65 to the first side wall 27 of the cavity 15 at a point adjacent the intersection 35 between the top of the back wall 25 of the cavity 15 and the mouth 21 of the bucket 13. The pivot means preferably includes a second pivot means 77 for pivotally attaching the lid unit adjacent the second side edge 69 of the panel member 65 to the second side wall 29 of the cavity 15 at a point adjacent the intersection 35 between the top of the back wall 25 of the cavity 15 and the mouth 21 of the bucket 13. The first pivot means 75 preferably includes a hinge pin unit or means 79 for being attached to the bucket 13 at a location adjacent the intersection between the back wall 25 and first side wall 27 of the cavity 15 and for extending through a portion of the lid unit adjacent the first side edge 67 of the panel member 65 as shown in FIG. 10. The hinge pin unit 79 may include a molded plastic member having a body 80, a number of barbed posts 81 for securing the body 80 to the bucket 13 by being pressed into the top of the first side wall 27 (the top of the first side wall 27 may be formed or cut to receive the body 80 and posts 81 as clearly shown in FIG. 5), and a hinge pin 82 attached to the body 80 for extending through a portion of the lid unit as will now be apparent to those skilled in the art. The second pivot means 77 preferably includes a hinge pin unit 83 for being attached to the bucket 13 at a location adjacent the intersection between the back wall 25 and the second side wall 29 of the cavity 15 and for extending through a portion of the lid unit adjacent the second side edge 69 of the panel member 65 as shown in FIG. 10. The hinge pin unit 83 is preferably a mirror image of the hinge pin unit 79 and may include a molded plastic member having a body 84, a number of barbed posts 85 for securing the body 84 to the bucket 13 by being pressed into the top of the second side wall 29, and a hinge pin 86 attached to the body 84 for extending through a portion of the lid unit as will now be apparent to those skilled in the art.

The center of the curve in the bottom 31 and front wall 23 of the cavity 15 from the intersection 33 of the bottom 31 and the bottom of the back wall 25 of the cavity 15 is preferably aligned with the rotational axis of the first and second pivot means 75, 77, i.e., with an axis that extends through both hinge pins 82, 86 when each hinge pin unit 79, 83 is attached to the bucket 13 for reasons which will hereinafter become apparent.

The container 11 includes arm means 87 forming part of the lid unit thereof. The arm means 87 is fixedly joined to the lid 63 for movement with the lid 63 between a first position when the lid 63 is in the closed position and a second position when the lid 63 is in the opened position for substantially separating the minnows 19 from the water 17 when moved from the first position to the second position. The arm means 87 preferably includes a perforated panel member 89 having a first side edge 91, a second side edge 93, a third side or upper edge 95, and a fourth side or lower edge 97. The panel member 89 may be perforated in any manner now apparent to those skilled in the art such as, for example, having a plurality of spaced apart apertures or slots 98 therethrough of a size which readily allows fluid such as water 17 to pass therethrough but which prevents the minnows 19 or the like from passing therethrough. The upper edge 95 of the panel member 89 is preferably fixedly joined to the back edge 73 of the panel member 65 of the lid 63. A lower wall or lip 99 is preferably attached to the lower edge 97 of the panel member 89. A first side wall 101 is preferably attached to the first side edge 91 of the panel member 89, to one end of the lip 99, and to the first side edge 67 of the panel member 65. An aperture 102 is preferably provided through the first side wall 101 substantially adjacent the intersection between the panel member 65 and the panel member 8 for pivotally receiving the hinge pin 82 as clearly shown in FIG. 10. A second side wall 103 is preferably attached to the second side edge 93, to the other end of the lip 99, and to the second side edge 69 of the panel member 65. An aperture 104 is preferably provided through the second side wall 103 substantially adjacent the intersection between the panel member 65 and the panel member 89 for pivotally receiving the hinge pin 86 as clearly shown in FIG. 10. The panel member 89 of the arm means 87, the lip 99, the first side wall 101 and the second side wall 103 coact to form a chamber 105 for holding the minnows 19 when the lid 63 is moved to the opened position as will now be apparent to those skilled in the art.

The lid unit (i.e., the lid 63 including the panel member 65, the arm means 87 including the panel member 89, the lip 99, the first side wall 101, and the second side wall 103) may be constructed in various manners out of various materials in various specific designs and sizes. Preferably, the various components of the lid unit (i.e., the lid 63 including the panel member 65, the arm means 87 including the panel member 89, the lip 99, the first side wall 101, and the second side wall 103) are molded out of plastic as a one-piece, integral unit.

The operation of the container 11 is quite simple. To fill the cavity 15 with water 17 and minnows 19 or the like, the lid 63 is merely lifted from the closed position to the opened position and the water 17 and minnows 19 are placed in the chamber 105. The ridges 74 provide a better grip for the user of the container 11 when moving the lid 63 between the closed and opened positions. The water 17 will, of course, pass through the slots 98 in the perforated panel member 89 of the arm means 87 into the cavity 15. The lid 63 can then be moved back to the closed position and the minnows 19 in the chamber 105 will be released into the water 17 in the cavity 15 as the arm means 87 pivots back to the first position. It should be noted that the water 17 in the cavity 15 will be aerated by passing back and forth through the perforations in the panel member 89 of the arm means 87 when the lid 63 is moved back and forth between the opened and closed positions. The front end of the panel member 65 of the lid 63 will rest on the upper surface of the front portion 39 when the lid 63 is in the closed position so that the upper surface of the panel member 65 will be substantially horizontal. When it is subsequently desired to remove one or more minnows 19 or the like from the bucket 13, the user can merely insert one or more fingers into the central notch 40 in the front face of the bucket 13, engage the bottom surface of the front end of the panel member 65 of the lid 63, and pivot the lid 63 to the opened position whereby the perforated panel member 89 of the arm means 87 will rotate through the water from the first or lowered position adjacent the back wall 25 of the cavity 15 to the second or raised position adjacent the mouth 21 of the bucket 13 to thereby separate the minnows 19 from the water 17 in the cavity 15. One or more minnows 19 can then be selected from the minnows 19 in the chamber 105. It should be noted that the lip 99 and side walls 101, 103 will coact when the lid 63 is in the opened position to form the chamber 105 and to prevent or reduce the possibility of any of the minnows 19 on the panel member 89 from jumping or flopping off the arm means 87, etc., as will now be apparent to those skilled in the art. After the desired minnow 19 or minnows 19 are selected, the lid 63 is moved back to the closed position, releasing the remaining minnows 19 back into the water 17 in the cavity 15 and, at the same time, aerating the water 17. Easy rotation of the lid unit between the closed and opened positions is insured by having the center of the curve in the bottom 31 and front wall 23 of the cavity 15 from the intersection 33 of the bottom 31 and the bottom of the back wall 25 of the cavity 15 substantially aligned with an axis that extends through both apertures 102, 104 in the side walls 101, 103, and through both hinge pins 82, 86, and by having the distance from the center of the apertures 102, 104 in the side walls 101, 103 to the outer edge of the arm means 87 slightly less than the distance from the center of the hinge pins 82, 86 to the bottom 31 and front wall 23 of the cavity 15 as will now be apparent to those skilled in the art. While the distance from the center of the apertures 102, 104 in the side walls 101, 103 to the outer edge of the arm means 87 is slightly less than the distance from the center of the hinge pins 82, 86 to the bottom 31 and front wall 23 of the cavity 15, the difference should not be so great that a minnow 19 could pass through the clearance between the lid unit and the walls of the cavity 15 as will now be apparent to those skilled in the art. The top edge of the back wall 25 of the cavity 15 may be chamfered as at 107 to prevent interference between the back wall 25 and the lid unit as the lid unit is moved between the closed and opened positions.

Although the present invention has been described and illustrated with respect to a preferred embodiment and a preferred use therefor, it is not to be so limited since modifications and changes can be made therein which are within the full intended scope of the invention.

I claim:

1. A container comprising:
  a) a bucket having a cavity for holding a quantity of fluid and a quantity of items dispersed in the quantity of fluid; said bucket having a mouth for allowing access to said cavity, and said cavity in said bucket having a front wall, a back wall, a first side wall, a second side wall, and a bottom; the end of said back wall of said cavity in said bucket opposite the intersection of said bottom and back wall thereof intersecting said mouth of said bucket; and said bottom and front wall of said cavity in said bucket curving upwardly from the intersection of said bottom and back wall of said cavity in said bucket;
  b) a lid movable between a first position in which said lid covers said mouth of said bucket and a second position in which said lid is positioned away from said mouth of said bucket;
  c) arm means fixedly joined to said lid for movement with said lid between a first position when said lid is in said first position and a second position when said lid is in said second position, and for substantially separating the quantity of items dispersed in the quantity of fluid from the quantity of fluid when moved from said first position to said second position; said arm means including a perforated panel member having a first side edge, a second side edge, a third side edge, and a fourth side edge, said third side edge of said panel member of said arm means being fixedly joined to said lid, and said panel member being substantially the same size and shape as said back wall of said cavity in said bucket;
  d) wall members attached to said first and second side edges of said panel member of said arm means for coating with said lid to form an opened chamber for holding the quantity of items when said lid and said arm means are moved from said first positions to said second positions; and
  e) pivot means for pivotally attaching said lid to said bucket to allow said lid and said arm means to pivot between said first and second positions, said pivot means including a first pivot means for attaching one side of said lid to said first side wall of said cavity in said bucket at a point adjacent the intersection between said back wall of said cavity in said bucket and said mouth of said bucket; said pivot means further including a second pivot means for attaching the other side of said lid to said second side wall of said cavity in said bucket at a point adjacent the intersection between said back wall of said cavity in said bucket and said mouth of said bucket.

2. The container of claim 1 in which the center of the curve in said bottom and front wall of said cavity in said bucket from the intersection of said bottom and back wall of said cavity in said bucket is aligned with the rotational axis of said first and second pivot means.

3. A live fish bait container comprising:
  a) a bucket having a cavity for holding a quantity of water and a quantity of live fish bait dispersed in the quantity of water; said bucket having a mouth for allowing access to said cavity; said cavity in said bucket having a front wall, a back wall, a first side wall, a second side wall, and a bottom, said bottom and front wall of said cavity in said bucket curing upwardly from the intersection of said bottom and back wall of said cavity in said bucket;
  b) a lid movable between a first position in which said lid covers said mouth of said bucket and a second position in which said lid is positioned away from said mouth of said bucket;
  c) arm means fixedly joined to said lid for movement with said lid between a first position when said lid is in said first position and a second position when said lid is in said second position, and for substantially separating the quantity of live fish bait dispersed in the quantity of water from the quantity of water when moved form said first position to said second position; said arm means including a perforated panel member having a first side edge, a second side edge, a third side edge, and a fourth side edge; in which said third side edge of said panel member of said arm means is fixedly joined to said lid; said panel member of said arm means being substantially the same size and shape as said back wall of said cavity in said bucket;

f) wall members attached to said first and second side edges of said panel member of said arm means for coating with said lid t form an opened chamber for holding the quantity of live fish bait when said lid and said arm means are moved from said first positions to said second positions; and e) pivot means for pivotally attaching said lid to said bucket to allow said lid and said arm means to pivot between said first and second positions; said pivot means including a first pivot means for attaching one side of said lid to said first side wall of said cavity in said bucket at a point adjacent the intersection between said back wall of said cavity in said bucket and said mouth of said bucket; said pivot means including a second pivot means for attaching the other side of said lid to said second side wall of said cavity in said bucket at a point adjacent the intersection between said back wall of said cavity in said bucket and said mouth of said bucket.

4. The container of claim 3 in which the center of the curve in said bottom and front wall of said cavity in said bucket from the intersection of said bottom and back wall of said cavity in said bucket is aligned with the rotational axis of said first and second pivot means.

* * * * *